United States Patent [19]

Gaag et al.

[11] Patent Number: 4,954,187

[45] Date of Patent: Sep. 4, 1990

[54] PRECIPITATES COPPER-ZINC ALLOY WITH NICKEL SILICIDE

[75] Inventors: Norbert Gaag, Leinburg; Peter Ruchel, Lauf/Pegn., both of Fed. Rep. of Germany

[73] Assignee: Diehl GmbH & Co., Nuremberg, Fed. Rep. of Germany

[21] Appl. No.: 260,199

[22] Filed: Oct. 20, 1988

[30] Foreign Application Priority Data

Oct. 22, 1987 [DE] Fed. Rep. of Germany ....... 3735783

[51] Int. Cl.$^5$ ............................................. C22F 1/08
[52] U.S. Cl. .................................. 148/413; 148/434; 420/479; 420/480
[58] Field of Search ................. 420/479, 480; 148/413, 148/434

[56] References Cited

U.S. PATENT DOCUMENTS

| | | | |
|---|---|---|---|
| 1,792,944 | 2/1931 | Vaders | 420/479 |
| 1,907,219 | 5/1933 | Sieg | 420/479 |
| 2,372,202 | 3/1945 | Hensel et al. | 148/413 |
| 3,252,793 | 5/1966 | Heese | 420/479 |
| 3,703,367 | 11/1972 | Cocks | 420/479 |
| 3,713,814 | 1/1973 | Larsson | 420/479 |
| 4,191,564 | 3/1980 | Hirao et al. | 420/479 |
| 4,676,848 | 6/1987 | Ruchel et al. | |

FOREIGN PATENT DOCUMENTS

| | | |
|---|---|---|
| 0175872A | 4/1986 | European Pat. Off. |
| 456342 | 2/1928 | Fed. Rep. of Germany |
| 582342 | 8/1933 | Fed. Rep. of Germany |
| 759865 | 7/1949 | Fed. Rep. of Germany |
| 1154643 | 9/1963 | Fed. Rep. of Germany |
| 1205285 | 11/1965 | Fed. Rep. of Germany |
| 1558817 | 2/1975 | Fed. Rep. of Germany |
| 2830459 | 12/1979 | Fed. Rep. of Germany |
| 2919478 | 11/1980 | Fed. Rep. of Germany |
| 57-114632 | 7/1982 | Japan |

*Primary Examiner*—R. Dean
*Assistant Examiner*—Margery S. Phipps
*Attorney, Agent, or Firm*—Scully, Scott Murphy & Presser

[57] ABSTRACT

Utilization of a copper-zinc alloy for semifinished materials and semi-manufactured articles; especially synchronizing rings. The copper-zinc alloy is essentially constituted of 50 to 65% copper, 1 to 6% aluminum, 0.5 to 5% silicon, 5 to 8% nickel, as well as selectively 0 to 1% iron, 0 to 2% lead, 0 to 2% manganese, all in percent by weight, with zince as the remainder, as well as unavoidable impurities, whereby the nickel is overwhelmingly present in an intermetallic composition with silicon (nickel-silicide). The silicides are in round, uniformly distributed fine precipitate form.

5 Claims, No Drawings

PRECIPITATES COPPER-ZINC ALLOY WITH NICKEL SILICIDE

BACKGROUND OF THE INVENTION

1. Field of the Invention

The present invention relates to the utilization of a copper-zinc alloy for semifinished materials and semi-manufactured articles; especially synchronizing rings.

For synchronizing rings which are employed in motor vehicle drives or transmissions, a high coefficient of friction and a high wear resistance are of particular significance as their characterizing magnitudes. A high coefficient of friction is essential for a rapid and precise shifting; meaning, the shifting comfort, whereas a high wear resistance is essential to the strength or steadiness of the synchronizing rings.

From the state of technology there have already become known a multiplicity of copper-zinc alloys which are employed for synchronizing rings. However, these alloys, to a large measure, are no longer capable of meeting the ever increasing demands which are placed on the transmissions and their synchronizing rings, because of the increase in the power of the engines. Consequently, it is an object of the invention to propose a copper-zinc alloy whose friction value or coefficient of friction lies higher in comparison with heretofore known alloys, whose resistance to wear is at least equal to or higher than that of current alloys, and which is less expensive to produce than the most closely approaching alloys obtainable from the present state of the technology.

The foregoing object is inventively achieved through the utilization of a copper-zinc alloy, which is essentially constituted of 50 to 65% copper, 1 to 6% aluminum, 0.5 to 5% silicon, 5 to 8% nickel, as well as selectively 0 to 1% iron, 0 to 2% lead, 0 to 2% manganese, all in percent by weight, with zinc as the remainder, as well as unavoidable impurities, whereby the nickel is overwhelmingly present in an intermetallic composition with silicon (nickel-silicide) which are present finely and uniformly dispersed in a rounded-off form for semifinished materials and semi-manufactured articles, which in addition to a good load-carrying capacity and a high wear resistance, possess a relatively high coefficient of friction; being especially adapted for synchronizing rings.

For the herein proposed alloy, of particular significance is the freedom from cobalt, the extremely high proportion of nickel in comparison with comparable alloys, as well as the preferable freedom from manganese. However, in special instances, within the scope of the invention there can also be contemplated additions of up to 2% of manganese, when there is required an increase in the resistance to wear, and there can be tolerated a slight reduction in the coefficient of friction in conjunction therewith.

Furthermore, an important aspect of the proposed alloy resides in the presence of an intermetallic compound of nickel and silicon; namely, of nickel-silicide, as well as a constituent of unbound nickel. This nickel-silicide is present in a rounded-off form. These nickel-silicides possess a degree of lower hardness than manganese or iron-silicides and, notwithstanding their good wear resistance, cause a slight wear of the worktool during the machining of the synchronizing rings.

It is further noted as being advantageous in the proposed alloy, that iron is not contemplated as being a "must" or necessary constituent. A minute iron content is, however, permissible.

2. Discussion of the Prior Art

In the current state of the technology, the subject matter of the present invention is approached the closest by an alloy as described in German Patent No. 28 30 459. The alloy which is elucidated therein has a composition of 45 to 75% copper, 2 to 7% aluminum, 0.1 to 2% iron, 1 to 5% nickel, 0.5 to 2% silicon, 0.1 to 2% cobalt, with the remainder being zinc. An alloy which has in actuality been produced pursuant to this German Patent, possesses a composition of 58.5% copper, 31.5% zinc, 0.7% iron, 3% nickel, 0.8% silicon, 4% aluminum and 1.5% cobalt. Even this alloy, which is utilizable for synchronizing rings, is based on the properties of the nickel-silicides. Nevertheless, in this known alloy there are, however, additionally present cobalt-silicides, which tend towards a cluster-like agglomeration. As a consequence thereof, the machineability of this alloy is adversely affected.

In contrast with these known alloys, the alloy, which is proposed pursuant to the present invention, evidences a slightly increased coefficient of friction at about the same wear resistance; however, the outstanding distinction consists of in that the inventively proposed alloy does not possess any cobalt and, as a result, can be produced at a reduction in cost by about 10%. The increased nickel component does not counteract this advantage, inasmuch as nickel can be obtained inexpensively through cheap nickel-silver (German silver) scrap. The freedom from or absence of cobalt does not only render the proposed alloy less expensive, but due to the lacking inclination towards formation of silicide clusters, renders it easier to cast.

In contrast with standard alloys which are currently being marketed, the proposed alloy evidences an improvement in the coefficient of friction of about 20% and an improvement in the wear resistance of approximately 30%, without causing the production thereof to become more expensive.

In its composition, the inventive alloy is somewhat more remove from that which is disclosed in German Published Patent Application No. 1 -205 285, in which there is permitted a content of 58% copper, up to 50% zinc, up to 11% aluminum, up to 6.6% manganese, up to 2% silicon, up to 30% nickel, as well as up to 5% iron and 1% lead. This known alloy is not contemplated for use in synchronizing ring, but particularly for friction bearings and the like; in essence, for such applications which are dependent upon a low coefficient of friction. Because of the determined relative Mn/Si quantities, and the actual composition obtainable from the examples which are given in the patent; however, there can be ascertained that nickel-silicides cannot occur therein, inasmuch as the silicon which is present in only a minute volume, is completely bound off by manganese. There is no discussion in the invention as to the properties of the alloy indicated therein with a content of 12% nickel. One skilled in the art could not derive any suggestion from the description of this known alloy concerning the inventive utilization, that a high proportion of nickel-silicides should be decisive to the required properties of the inventive alloy.

Furthermore, from German Laid-Open Patent Application No. 15 58 817 there has also become known a copper-zinc alloy for its application to synchronizing rings, in which there is provided of between 0 to 45% zinc, 0.1 to 12% aluminum, 0.1 to 14% manganese, 0 to 2.5% silicon, 0.1 to 6% nickel, 0to 6% iron and 0 to 3% lead, with the remainder being copper. From the fact that silicon represents a selective component, and wherein in the represented examples silicon is set forth with only low proportions, there can be already ascertained that silicides apparently do not represent any significant constituent. Moreover, in the presence of silicon, because of the presence of manganese, there would be primarily formed manganese-silicides. This is obtained because of the higher bonding effect of manganese with silicon in contrast to nickel with silicon. The known alloy therefore provides no suggestions concerning the present invention.

Quite similar, as in the alloy of the previously mentioned patent, are the conditions in the alloy pursuant to German Patent No. 1 154 643. Also in that instance is there indicated a utilization with regard to synchronizing rings; however, the element of silicon is, in this instance, also only a selective component, or present in only small additions, such that also in this instance, silicides play no role or only an extremely subordinated role with regard to the resistance to wear. Both known alloys, for the remainder, have set out manganese as "must" or necessary constituents.

Also German Laid-Open Patent Application No. 2 919 478 relates to the utilization for synchronizing rings, and evidences a high manganese-content, an average content of silicon, and in contrast therewith, an extremely low content of nickel. In this case, as a result, there cannot occur any nickel-silicides, inasmuch as all silicon is bonded off by the manganese which is present to a considerable excess.

DESCRIPTION OF THE INVENTION

In contrast with overall state of the technology, as an essential feature of the invention is the maintenance of the high content of nickel-silicides, which should consist of at least 4%; however, preferably of about 6%. Moreover, a proportion of unbound nickel is of importance to the good properties of the alloy. On the other hand, the content of unbound nickel has an upper limit placed thereon through an increase in the forging temperature. In addition thereto, inasmuch as because of the high alloying effectiveness of the nickel, the nickel component must have an upper limit imposed thereon, inasmuch as one does not wish to proceed beyond the range of the readily machineable brass alloys.

In the following tables there are represented examples of an actual alloy in relation to comparative alloys, as well as typical characteristic magnitudes.

TABLE 1

| Composition of the Experimental Alloy (Amounts in % by Weight) | | | | | | | |
|---|---|---|---|---|---|---|---|
| Alloy No. | Cu | Zn | Fe | Ni | Si | Al | Co | Mn |
| 1 | 58.5 | 31.5 | 0.7 | 3.0 | 0.8 | 4.0 | 1.5 | — |
| 2 | 57.9 | 29.0 | 0.7 | 3.0 | 0.8 | 4.0 | 1.5 | 3.0 |
| 3 | 58.0 | Rest | 0.3 | — | 0.6 | 1.6 | — | 2.0 |
| 4 | 58.3 | 29.5 | 0.7 | 6.0 | 1.44 | 4.0 | — | — |

TABLE 2

| Characteristics Data of the Alloys from Table 1 | | | |
|---|---|---|---|
| Alloy No. | Hardness Displayed HB | Friction Value (Coeff.) (Average Value) | Wear Value km/g (Aver. Value) |
| 1 | 222 | 0.116–0.131 | 186–366 |
| 2 | 218 | 0.119–0.130 | 276–441 |

TABLE 2-continued

| Characteristics Data of the Alloys from Table 1 | | | |
|---|---|---|---|
| Alloy No. | Hardness Displayed HB | Friction Value (Coeff.) (Average Value) | Wear Value km/g (Aver. Value) |
| 3 | 167 | 0.099–0.128 | 162–237 |
| 4 | 222 | 0.125–0.134 | 202–240 |

Alloy No. 1 pertains to an alloy which is currently being marketed in conformance with that of the above-mentioned German Patent 28 30 459. Alloy No. 2 consists of the same type of alloy; however, with an addition of 3% manganese. Alloy No. 3 represents a standard alloy of the type of CuZn 40 Al 2 with a composition of 58% copper, 1.6% aluminum, 2% manganese, 0.6% silicon, no nickel, 0.3% iron and 0.6% lead, with the remainder being zinc. Finally, Alloy No. 4 is the inventive alloy in the preferred composition thereof.

From the above-mentioned tables there is ascertained, that the inventive alloy possesses the same hardness as Alloy No. 1, and its friction value or coefficient of friction is at a somewhat higher level than that of Alloy No. 1 and its wear resistance properties is comparable to Alloy No. 1; however, less dispersed than this. It is also possible to recognize from the above tables that Alloy No. 2 is only slightly poorer in its friction values, however, and in its wear resistance value is significantly better than the inventive alloy. In contrast with Alloys No. 1 and 2 which are extremely good in their characterizing properties, the inventive alloy is better in its value or coefficient of friction; however, comparable or only slightly poorer in its values of wear resistance; but with a significantly lesser dispersed breadth of the results. However, these results are achieved by the inventive alloy due to the elimination of the element cobalt, and thereby at significantly lower production costs.

From the two tables there is also obtained that the inventive alloy, in comparison with standard alloys which are currently being marketed and of which a typical representative is Alloy No. 3, achieves significantly better results in every aspect at comparable production costs.

The inventively proposed alloy is produced by means of the following process. The smelt is cast in a continuous casting method at a pouring temperature of 1050° to 1100° C. Thereafter, the obtained billets are warm-shaped at a temperature of between 600° to 800° C., preferably at 720° C., and thereafter cooled in air. Subsequently, the samples are again forged at a temperature of between 600° to 800° C., preferably at 720° C., and thereafter again cooled in air. Finally, there is implemented an exposure of the samples at a temperature of between 200° to 300° C. over a period of time of 5 to 20 hours, whereby with respect to the hardness which is attainable, a temperature of 250° C over 10 hours has been found to be advantageous. Achieved thereby was an increase in hardness of 16 to 17 HB for the inventive alloy in comparison with the forge-hardened condition. At this temperature, the α-component constituted 1%. The matrix image illustrated round, uniformly distributed silicides, adjacent thereto fine precipitates, which are partly unconnectedly contacted against the grain boundaries.

What is claimed is:

1. A copper-zinc alloy, consisting essentially of 50 to 60 wt. % copper 1 to 6 wt. % aluminum, 0.5 to 5 wt. % silicon, 5 to 8 wt. % nickel, 0 to 1 wt. % iron, 0 to 2 wt.

% lead, 0 to 2 wt. % manganese, with the remainder being zinc, said nickel being primarily present in an intermetallic composition with silicon as nickel-silicides, which are present in a rounded off shaped finely and uniformly distributed form, said allow having a good load carrying capacity, a high resistance to wear and possessing a uniformly high coefficient of friction.

2. The alloy of claim 1, constituted of 55 to 60% copper, 3 to 5% aluminum, 1 to 3% silicon, 6 to 7% nickel, 0 to 1% iron, 0 to 1% lead, with the remainder being zinc.

3. The alloy of claim 2, constituted of 58% copper, 4% aluminum, 1.5% silicon, 6% nickel, 0.7% iron, with the remainder being zinc.

4. The alloy of claim 2 constituted of 58% copper, 4% aluminum, 1.5% silicon, 6% nickel, with the remainder being zinc.

5. A synchronizing ring made of an alloy of any of claims 1-4.

* * * * *

UNITED STATES PATENT AND TRADEMARK OFFICE
CERTIFICATE OF CORRECTION

PATENT NO. : 4,954,187

DATED : September 4, 1990

INVENTOR(S) : Norbert Gaag, et al.

It is certified that error appears in the above-identified patent and that said Letters Patent is hereby corrected as shown below:

On the Title page, Section [54]: "PRECIPITATES COPPER-ZINC ALLOY WITH NICKEL SILICIDE" should read as --COPPER-ZINC ALLOY WITH NICKEL SILICIDE PRECIPITATES--

Column 5, line 5, Claim 1: "allow" should read as --alloy--

Signed and Sealed this

Seventeenth Day of December, 1991

*Attest:*

HARRY F. MANBECK, JR.

*Attesting Officer*  *Commissioner of Patents and Trademarks*